3,256,237
POLYPROPYLENE STABILIZED WITH ORGANIC THIOPHOSPHITES
John A. Casey, Santurce, Puerto Rico, assignor to Sun Oil Company, Philadelphia, Pa., a corporation of New Jersey
No Drawing. Filed June 30, 1964, Ser. No. 379,398
20 Claims. (Cl. 260—45.8)

This invention relates to the stabilization of propylene polymers and more particularly to new compositions of matter comprising a solid crystalline polymer of propylene and an inhibitor. This application is a continuation-in-part of application Serial No. 849,185 filed October 28, 1959, now abandoned, which application is in turn a continuation-in-part of application Serial No. 791,251 filed February 5, 1959.

Polymers which are included in the compositions of this invention are the relatively high molecular weight solid crystalline polymers of propylene. These polymers may be homopolymers or block copolymers; e.g., see Church application Serial No. 700,761 filed December 15, 1957, Schneider et al. application Serial No. 424,819 filed January 11, 1965, and Khelghatian et al. application Serial No. 244,281 filed December 13, 1962, with regard to such block copolymers and their preparation.

Such homopolymers can be prepared by the polymerization of the olefin using a solid catalytic material. A catalyst which is especially effective for the polymerization of propylene to relatively high molecular weight solid polymers is the combination of a lower halide of titanium, such as titanium trichloride, and an aluminum compound having the formula $R_1R_2R_3Al$ wherein $R_1$ is hydrocarbon and each of $R_2$ and $R_3$ are the same or different hydrocarbon or halogen groups, such as aluminum triethyl, diethyl aluminum chloride or ethyl aluminum dichloride. This type of catalyst can be prepared by admixing, for example, titanium tetrachloride and aluminum triethyl in an inert solvent, such as isooctane or other hydrocarbons. This mixture acts as a catalyst for polymerizing the alpha-olefin to solid polymers. If desired, a lower halide such as titanium trichloride can be preformed, dispersed in an inert liquid, and an activator, such as one of the foregoing aluminum compounds, added. In performing the polymerization step, propylene is contacted with the solid catalyst, such as by passing the olefin into the liquid reaction mixture and is thereby polymerized to solid polymers. Anhydrous and oxygen-free conditions are used throughout the process, since the catalyst is deactivated by contact with water or oxygen.

In addition to the foregoing, the following applications illustrate block copolymer processes and catalysts suitable for the preparation of the propylene block copolymers contemplated by the present application, Jezl et al. application Serial No. 241,032 filed November 29, 1962, and Jezl et al. application Serial No. 243,613 filed December 10, 1962. Other specific catalyst systems, i.e., other metal halide or metal oxide catalyst systems, as well as other process conditions, necessary for the preparation of the polypropylene described herein are illustrated by pages 350 through 361, pages 416 through 419, page 452 and page 453 of "Linear and Stereoregular Addition Polymers" by Norman G. Gaylord and Herman F. Mark, Interscience Publishers, 1959, the contents of which are incorporated herein by reference.

Propylene homopolymers and block copolymers as above-described have a melting point of from 160° C. to 170° C., a tensile strength of from 3,000 to 6,000 p.s.i. (pounds per square inch), and an average molecular weight of from 50,000 to 850,000 or more (determined by light-scattering). Usually, a mixture of crystalline and amorphous polymer is obtained. If desired, amorphous polymer can be separated from the crystalline polymer by contacting a mixture thereof with a hydrocarbon solvent, such as isooctane or n-heptane, at an elevated temperature. The amorphous polymer is substantially soluble under these conditions whereas the crystalline polymer is substantially insoluble. The compositions of the present invention are prepared from either crystalline or mixtures of crystalline with amorphous polymers in which the mixture contains at least 25% by weight, and preferably at least 50% by weight, of the crystalline polymer. In addition to the foregoing characteristics, the block copolymers contemplated by this invention, as aforesaid, have improved impact properties even at low temperatures.

Such polymers may be molded or otherwise fabricated to form many useful articles. However, propylene polymers are susceptible to degradation caused by heat, oxidation, light (especially ultra-violet light) and mechanical working. This degradation apparently results from free-radical formation within the polymer molecules, which formation is promoted by oxygen, heat, ultra-violet light, mechanical action, and impurities such as metals and metal compounds. The free-radicals which are formed undergo chemical reaction with the polymer itself, resulting in undesirable chemical and physical transformations. Thus the propylene polymers deteriorate prematurely, lose tensile strength and other desirable properties such as pliability and impact strength, and become discolored and embrittled.

An object of the present invention is to provide compositions comprising the above-described solid, crystalline homopolymers and solid, crystalline block copolymers of propylene containing a minor, but stabilizing quantity of a material effective to inhibit degradation of said polymers resulting from heat, oxidation, light and/or mechanical working. It is another object of this invention to provide process for the formation of shaped articles derived from the aforesaid polymers which are stabilized against degradation resulting from the aforesaid causes.

According to one embodiment of the present invention, applicant has found that remarkably stable polyolefin compositions may be prepared by admixing with a solid, crystalline propylene polymer a stabilizing quantity of a compound having the general formula $(RS)_3P$, wherein each R is a hydrocarbon radical having from about 6 to about 20 carbon atoms. The hydrocarbon radicals may be the same or different alkyl, aryl, or cycloalkyl groups. For example, suitable compounds for use as the stabilizers of this invention include trilauryl trithiophosphite, tricetyl trithiophosphite, tridecyl trithiophosphite, tristearyl trithiophosphite, triphenyl trithiophosphite, tribenzyl trithiophosphite, tricyclohexyl trithiophosphite, tri(2-ethyl hexyl) trithiophosphite, trinaphthyl trithiophosphite, phenyl didecyl trithiophosphite, and diphenyl lauryl trithiophosphite.

The use of a stabilizing quantity, i.e., from about 0.005% to about 2% by weight of the trithiophosphites of this invention in one of the propylene polymers hereof imparts remarkable stability thereto against degradation by heat and oxidation, as well as against degradation caused by mechanical action and light, particularly light in the ultra-violet portion of the spectrum, as for example by extrusion of the polymer in producing useful products therefrom, and exposure of shaped articles thereof to sunlight.

In another embodiment of the invention, another material is added to the polyolefin, together with the trithiophosphite compound. This material appears to enhance the stabilizing action of the trithiophosphite compound, especially as to degradation by mechanical action and as to discoloration. This second stabilizer is a hydrocarbon substituted phosphite having the general formula (RO)₃P, wherein each R is a hydrocarbon radical having from about 6 to about 20 carbon atoms. The hydrocarbon radicals may be the same or different alkyl, aryl, or cycloalkyl groups, although aryl substituents are preferred. Suitable phosphite compounds for the preparation of the compositions of this invention include triphenyl phosphite, tribenzyl phosphite, trinaphthyl phosphite, tricyclohexyl phosphite, trinonyl phosphite, trieicosyl phosphite, and trilauryl phosphite.

Compositions according to this invention containing the phosphites and/or trithiophosphites hereof are made even more stable by including therein certain auxiliary materials, such as metal soaps, epoxy compounds, and polycarboxylic acids. Any one or any combination of these materials may be included, depending on the requirements of particular applications. Similar proportions, i.e. from about 0.005% to about 2%, of these additional stabilizers give good results.

Suitable metal soaps for use in the compositions of this invention include the soaps of Groups II, III, and IV metals, including those of beryllium, calcium, magnesium, strontium, barium, zinc, cadmium, aluminum, titanium, and zirconium. A partial list of suitable metal soaps includes calcium stearate, zinc stearate, zinc naphthenate, barium stearate, cadmium laurate, barium naphthenate, cadmium stearate, barium ricinoleate, barium laurate, aluminum stearate, titanium stearate, zirconium laurate, calcium myristate, barium palmitate, and their analogues and homologues having from about 8 to 18 carbon atoms per acyl group. Various mixtures of these soaps are marketed commercially, and these mixtures also give good results in the compositions of this invention.

Various epoxy resins may be used as the epoxy compound in the compositions of this invention. For example, the resins prepared by the reaction of epichlorohydrin with ethylene glycol, glycerol, or 4,4'-isopropylidene bisphenol give good results. Also various epoxidized fatty acids, terpenes, olefins, polyolefins, and fatty acid esters are suitable in the compositions of this invention. Suitable epoxy compounds include Epon 828 and 834—trademark of Shell Chemical Company for epoxy resins prepared by the condensation of a bisphenol and epichlorohydrin having the formula:

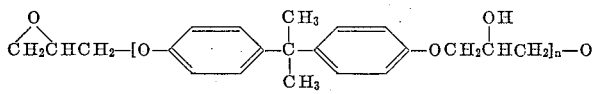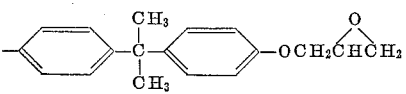

(828—epoxide equivalent of between 180 and 195 (grams of resin containing 1 gram equivalent of epoxide), viscosity at 25° C. of between 100 and 160 poises),
(834—epoxide equivalent of between 230 and 280, viscosity at 25° C. of a 70 weight percent solution in butyl carbitol of between 4.1 and 9.7 poises);
poly(allyl glycidyl ether); diglycidyl ether; glycidyl ethers of glycerol; epoxy fatty acid esters such as vinyl epoxy stearate, allyl epoxy stearate, butyl epoxy stearate, and cetyl epoxy stearate; di-n-butyl epoxyhexahydrophthalate and the di-n-hexyl, di-2-ethylhexyl, diisooctyl, di-n-decyl, and n-butyl decyl homologues thereof; 3,4-epoxycyclohexyl methanol esters of 2-ethylhexanoic acid, lauric acid, palmitic acid, 9,10-epoxystearic acid, 9,10,12,13-diepoxystearic acid, succinic acid, maleic acid, terephthalic acid, and sebacic acid; dialkyl 4,5-epoxycyclohexane-1,2-dicarboxylates, including the dimethyl, diethyl, dibutyl, di(2-ethylhexyl), di(isodecyl), and di(tridecyl) derivatives thereof; and epoxidized metal soaps such as calcium epoxy stearate, barium epoxy stearate, zirconium epoxy laurate, and calcium epoxy myristate acids are those having two or three carbon atoms between at least one pair of carboxyl groups. Suitable acids, for example, include succinic acid, glutaric acid, maleic acid, malic acid, citric acid, gluconic acid, trihydroxyglutaric acid, tricarballylic acid, itaconic acid, and aconitic acid. Preferably, such acids should have at least one hydroxyl group in addition to those in the carboxyl group. In addition to these acids, alkali and alkaline earth metal salts and partial esters of these acids, having at least two hydroxyl, carboxyl, or a combination of hydroxyl and carboxyl groups, may be used.

The stabilizing ingredients may be combined with the polyolefin by any method suitable for the preparation of homogeneous mixtures. For example, the polyolefin may be melted and the additives admixed therewith by milling on heated rolls, by using a Banbury mixer, or in a melt-extruding device. Alternatively, the additives may be combined, in a solid or molten state, with a solution or suspension of the polymer in a suitable liquid. A preferred process is to dissolve the additives in a suitable solvent, admix powdered polymer therewith, and evaporate the solvent. More uniform mixtures are obtained in this way, without danger of excessive degradation of the polymer. In any event, the mixing process should be carried out in an inert atmosphere, in order to prevent oxidation of the polymer.

As indicated above, it is an object of this invention to provide a process for the formation of shaped articles derived from the polymers of this invention, which shaped articles are stabilized against degradation resulting from heat, light, mechanical shear and oxygen. Said process involves intimately mixing the polymer with the stabilizer to provide a homogeneous mixture thereof, heating said mixture sufficiently to melt the polymer and forming shaped articles from said melt. The mixing step may be entirely separate from the melting step, or these steps may be performed simultaneously. In a preferred embodiment the polymer and the stabilizer, or stabilizers, are mixed prior to melting; however, to insure a homogeneous mixture mixing is continued during the melting step. For example, this preferred procedure can be performed in a conventional melt extruder by introducing a premixed polymer-stabilizer composition thereinto. The shaped articles contemplated by this invention include films, fibers, pellets and other shapes fabricated by conventional melt-extrusion, injection-molding, thermoforming, blow-molding, compression-molding, transfer-molding, powder-molding, or casting techniques.

Several criteria are used to determine the effectiveness of the stabilizers in the compositions of this invention.

Since the non-stabilized propylene polymers of this invention are normally drastically degraded when exposed to ultra-violet and visible light, particularly the high ultra-violet and the low visible light, the extent of this degradation is one criterion useful for illustrating the effectiveness of the synergistic stabilizing composition of this invention. One method of determining the extent of this degradation involves the use of the Carbon-Arc Lamp Test in the Atlas Fade-Ometer substantially in the manner described in Standard Test Method 16A–1957 of the American Association of Textile Chemists and Colorists. According to this test, yarns (multifilaments) or monofilaments under tension are exposed to the light produced by a carbon arc. Every 20 hours the filaments are examined to determine whether or not the filaments are broken. If so, the test is terminated; if not the test is continued until breakage occurs. Meanwhile, at 60 hour intervals, the filaments are tested on an Instron Tensile Tester and compared with unexposed filaments. In the illustrative examples given below, the filaments (i.e., mono- or multifilaments) are wound on standard black faced "mirror" cards (6½ x 9⅓ inches) and secured thereto at the margin with cellophane tape. Winding thereof is performed using a Universal winding device at a tension of 0.75 g., and when so-wound, each card contains 3 groups of filaments having 5 to 8 monofilaments or multifilaments in each group.

As the non-stabilized propylene polymers of this invention are normally drastically degraded during formation into articles of manufacture, e.g. by extrusion, molding, rolling, etc., the extent of this degradation is also measured. This is determined by the change in melt index. Melt index is a measure of melt viscosity, and is the rate, in grams per 10 minutes, at which the polyolefin composition is extruded through an orifice 0.0823 inch in diameter from a barrel 0.3760 inch in diameter under the force of a piston weighing 2160 grams, the composition being maintained at 230° C. (446° F.) during the extrusion. The initial melt index is determined by loading the cylinder with the composition, applying the piston, and heating for 5 minutes. Any extrudate is cut off, and the extrudate for the next 6 minutes is measured. The amount of this extrudate, converted to grams per 10 minutes (by multiplying 1⅔) is the initial melt index ($MI_a$). All the polymer is then extruded, and replaced in the cylinder. After 10 more minutes at 230° C., the piston is again inserted and all the polymer is extruded. The polymer is again returned to the cylinder, held for 10 minutes, and extruded. This time the polymer is returned to the cylinder and the piston applied immediately. After 4 minutes all extrudate is cut off, and the extrudate for the next 6 minutes measured. The amount of this extrudate, converted to grams per 10 minutes, is the final melt index ($MI_b$). The stability of a polymer composition is indicated by the ratio of $MI_b$ to $MI_a$, a low ratio indicating a high degree of stability. This ratio should be less than about 4.0 in order for the composition to be adaptable to a wide variety of processing methods, although slightly higher ratios are suitable for many applications.

It has been found, however, that some stabilizers are relatively ineffectual upon initial subjection to degrading conditions, but become substantially more effective after prolonged exposure to such conditions. A composition containing such a stabilizer would therefore have a relatively high initial melt index, so that the melt index ratio would be deceptively low. In order to more accurately compare these stabilizers with others, a standard initial melt index ($MI_s$) has been adopted. This standard initial melt index is the lowest of the initial melt indexes determined for a group of polypropylene compositions containing various stabilizers and groups of stabilizers. In the following examples, therefore, $MI_b/MI_s$ means the ratio between the final melt index ($MI_b$) of each composition, and the standard initial melt index for the group. For uniformity of product, this ratio should not be more than about 7.0.

In addition to degradation during fabrication, articles made from non-stabilized polyolefins are also rapidly degraded and oxidized by exposure to high temperatures during normal use of such articles. Such degradation and oxidation is evidenced by discoloration and by crazing and crumbling of the surface of the molded article. The crazing consists of small surface cracks which, once started, progress quite rapidly until the entire surface of the article is crazed. The crumbling also progresses quite rapidly after it first becomes noticeable. The molded articles become so friable that edges and corners are easily rubbed off with the fingers.

In the examples below, the molded articles used were molded sheets prepared from the propylene polymers of this invention, 3/32" to 1/8" thick. Above 3/32" the thickness of the sheet appears to have little or no effect on the resistance of the polyolefin to heat and oxidation. These sheets were placed in an oven and held at 280° F. until crazing appeared, or until they became friable, as evidenced by breaking a corner or an edge with the fingers. The oven life recorded in the examples is the number of hours at 280° F. before such evidence of degradation and oxidation appeared. An oven life of at least 500 hours is necessary for a polymer composition to be useful in a majority of applications.

The non-stabilized propylene polymers of this invention also become badly discolored during exposure to high temperatures. This discoloration does not appear to be directly related to the oxidation and degradation of the surface. Although the basic reason for the discoloration is not known for a certainty, it appears that it may be caused by various impurities in the polymer, such as the residue from the polymerization catalyst. It also appears that many stabilizers impart some color to the polymer, even though these stabilizers are effective to reduce degradation and oxidation of the polyolefins. Exposure to light, the high temperatures used during fabrication or in various applications of the polymer, apparently initiate some reaction between the various impurities which result in the formation of the color bodies which cause discoloration of the polymers.

A color scale has been devised to compare the colors of articles prepared from the propylene polymers of this invention. Colors on the scale range from No. 1, which is nearly clear, about like frosted glass, to No. 10, which is a dark, reddish brown, similar to dark mahogany. No. 2 color is slightly tinged with yellow, and No. 4 color has a slight orange tinge. Colors from 1 to 4 are deemed satisfactory for practically all applications of the polyolefins, while darker colors limit the use of the polymers to those applications where a dark color is not objectionable. The colors listed in the examples are the colors of the molded sheets in the 280° F. oven after one week (168 hours) or upon failure, whichever is less.

The following examples, wherein the proportion of stabilizers used indicates the weight percent of the stabilizers based on the weight of the compositions, illustrate the compositions of this invention.

EXAMPLE I

A composition of polypropylene containing 0.5% trilauryl trithiophosphite was prepared by dissolving the trilauryl trithiophosphite in acetone, admixing powdered polypropylene therewith, and evaporating the acetone. The polypropylene used was about 95% isotactic, and had a molecular weight of about 400,000 and a melting point of 335° F. In the table below, this is composition A, and is compared with composition B, which is the same polypropylene containing 0.5% of a highly regarded commercial rubber and polyethylene inhibitor, 2,2'-methylene-bis(4-ethyl-6-t-butyl phenol). In addition, comparative data is shown for the same polypropylene containing no inhibitor, shown as composition C. Composition D is the same polymer plus 0.5% of butyl epoxy stearate, and E is the same polymer plus 0.25% of calcium stearate.

TABLE 1

| Composition | $MI_a$ | $\dfrac{MI_b}{MI_a}$ | $\dfrac{MI_b}{MI_s}$ | Oven Life | Color |
|---|---|---|---|---|---|
| A | .089 | 4.1 | 6.7 | 1,482 | 1 |
| B | .063 | 2.9 | 3.4 | 280 | 10 |
| C | .192 | 10.5 | 37.2 | 12 | 1 |
| D | .198 | 14.0 | 51.6 | 24 | 1 |
| E | 1.918 | | 112.0 | 17 | 1 |

Thus it is seen that, although the 2,2'-methylene-bis(4-ethyl-6-t-butyl phenol) is slightly better for preventing degradation during processing the polymer, the trilauryl trithiophosphite of this invention also gives reasonably good processing stability, and in addition is far superior in imparting stability to molded articles in high temperature applications. In addition, the 2,2'-methylene-bis(4-ethyl-6-t-butyl phenol) badly discolors the polymer, whereas the trilauryl trithiophosphite imparts no color thereto, and prevents any discoloration which might be caused by the high temperature. Even after 1482 hours, this sample still had a No. 1 color.

Compositions D and E are particularly significant as the additive in each A, D and E is taught by the art to stabilizer for vinyl chloride polymers. It is very unexpected in these circumstances that the trilauryl trithiophosphite is vastly superior to calcium stearate and butyl epoxy stearate as a stabilizer for said polypropylene. Indeed, in view of the foregoing data, the latter two additives would be utterly useless as stabilizers for the propylene polymers of this invention, as their oven lives are not materially better than the non-stabilized polymer. More importantly, these latter two additives apparently cause increased degradation of the polymer during thermal working thereof; compare the $MI_b/MI_s$ ratios of C, and D and E.

EXAMPLE II

Additional compositions prepared with the polypropylene of Example I and 0.25% of triphenyl trithiophosphite, tricyclohexyl trithiophosphite, tridecyl trithiophosphite, or tri(2-ethylhexyl) trithiophosphite have an $MI_b/MI_a$ ratio of 3.5 to 4.2, an oven life in excess of 1200 hours, and a No. 1 color.

EXAMPLE III

A composition containing the polymer of Example I and 0.25% each of trilauryl trithiophosphite and triphenyl phosphite is prepared by the process described in Example I. This composition has an $MI_b/MI_a$ ratio of less than 2.5, and does not fail after 1400 hours in the 280° F. oven; color is No. 1.

In contrast to the foregoing, a composition of said polypropylene containing only 0.5% of the triphenyl phosphite had an $MI_b/MI_a$ ratio of 1.7, and oven life of 86 hours, and a No. 1 color. This comparison points up the criticality of the identity of the phosphorus compounds useful for the purposes of this invention. Moreover, it is significant that triphenyl phosphite is taught by the art as a stabilizer for vinyl chloride polymers.

EXAMPLE IV

A composition of the polymer of Example I containing 0.25% each of triphenyl trithiophosphite, phenyl didecyl phosphite, and calcium stearate has an $MI_b/MI_a$ ratio of less than 2.0, and does not fail after 1800 hours in the 280° F. oven. A No. 1 color is maintained.

EXAMPLE V

Compositions similar to that of Example IV, except that barium-cadmium laurate, butyl epoxy stearate, Epon 834, and citric acid, respectively, are substituted for the calcium stearate, give similar results.

EXAMPLE VI

A composition was prepared which contained the polymer of Example I plus 0.5% of trilauryl trithiophosphite, 0.5% of triphenyl phosphite, 0.05% of citric acid, and 0.25% of butyl epoxy stearate. This composition had an $MI_b/MI_a$ ratio of 1.6, an oven life in excess of 2000 hours, and a No. 1 color.

EXAMPLE VII

Example I was repeated using as an additive: (a) 0.5% of barium cadmium laurate to give an oven life of 46 hours; (b) 0.5% of Epon 834 to give an oven life of 64 hours. Thus, although each of the two foregoing materials as well as the trithiophosphites of this invention, are taught by the art as stabilizers for vinyl chloride polymers, the foregoing metal compound (a) and epoxy resin (b) are grossly inferior to the trithiophosphites of this invention when one attempts to use either of them to stabilize the propylene polymers of this invention. In fact, the oven life of the compositions containing (a) and (b) are not significantly better than that of the non-stabilized propylene polymers of this invention.

EXAMPLE VIII

Example I is repeated, substituting various crystalline propylene-ethylene block copolymers (described hereinbelow) for the polymer thereof. In all instances, each of the block copolymers I, II and III has an oven life (in Composition A) in excess of 1000 hours, whereas with each of Compositions B through E, results similar to those of Example I are obtained when these block polymers are used.

Preparation of block polymers (I)

Polymerization was carried out in accordance with the following procedure. A pressure reactor fitted with stirring means was flushed with nitrogen, and was partially filled with hexane. The catalyst, which consisted of aluminum diethyl chloride, titanium trichloride, and diethylene glycol dimethyl ether in a mol ratio of 2:1:.03 was then added in an amount such that the hexane contained 0.035 gram of titanium trichloride per 100 cc. The contents of the reactor were then brought to a temperature of 162° F., hydrogen was added in an amount of 16 parts per million by weight based on the weight of the hexane, and propylene was pressured in at 75 p.s.i.g. Polymerization of propylene commenced immediately, and was continued for 85 minutes, after which flow of pure propylene was discontinued, and a second feed, which consisted of 24% ethylene and 76% propylene, was pressured into the reactor. Polymerization was continued with this feed for 85 minutes, after which the reaction was killed by the addition of methanol. The reaction product was worked up, and a solid, highly crystalline block polymer was recovered. The total polymer contained 7.2% ethylene, as calculated from a material balance, and the solid block polymer, which amounted to 80% of the total polymer had a flow rate of 2.3, a brittle point of −13.5° C., as determined by ASTM D746–57T and a tensile impact strength as determined by ASTM 1822–61T of 94. Pure polypropylene of this flow rate has a brittle point of 14° C. and a tensile impact strength of 28.

(II)

A water jacketed polymerization reactor was charged with n-hexane, titanium trichloride, ethyl aluminum dichloride, and ethyl orthosilicate in quantities such that the hexane contained 0.07 gram of titanium trichloride per 100 cc. and the mol ratio of ethyl aluminum dichloride to titanium trichloride to ethyl orthosilicate was 2:1:0.65. The reactor contents were brought to 160° F. Hydrogen was added to the reactor in an amount of 16.5 parts per million by weight based on the weight of the hexane. The reactor was then pressured with 75 p.s.i.g. propylene partial pressure. The total pressure was 81 p.s.i.g., 6 p.s.i.g. being due to hydrogen and hexane partial pressures. Polymerization started immediately and was continued for 94 minutes while maintaining the pressure at 81 p.s.i.g. Flow of propylene was then discontinued, and a mixture of 20% ethylene and 80% propylene was introduced into the reactor at a pressure of 81 p.s.i.g. Polymerization was continued for 196 minutes with this feed stock, after which the reaction was stopped by the addition of methanol. By material balance, it was calculated that the total product recovered from the reactor, which was 83% insoluble in boiling pentane, contained 4.8% ethylene. The product, which had a flow rate of 2.4, was molded into test pieces, and the brittle point was determined by ASTM D746–57T, and tensile impact by ASTM D1822–61T. The brittle point was −4.5° C. and the tensile impact was 44. Polypropylene having a flow rate of 2.4 has a brittle point of 13° C. and a tensile impact of 28.

(III)

Copolymerization was carried out in accordance with the following procedure. A pressure reactor fitted with stirring means was flushed with nitrogen and was partially filled with hexane. The catalyst, which consisted of aluminum diethyl chloride, titanium trichloride, and diethylene glycol dimethyl ether in a mol ratio of 2:1:.03 was then added in an amount such that the hexane contained 0.035 grams of titanium trichloride per 100 cc. of hexane. The contents of the reactor were then brought to a temperature of 160° F., hydrogen was added in an amount of 20 parts per million by weight based on the weight of the hexane, and a mixture of 3 mol percent ethylene and 97% propylene was pressured in at 75 p.s.i.g. Polymerization started immediately and was continued for 12 minutes, while maintaining the pressure constant by the addition of the mixture. This feed was then discontinued and a second feed consisting of ethylene alone was pressured into the reactor for 1 minute, after which flow of the first feed to the reactor was resumed. This was repeated several times, the entire polymerization cycle being as follows:

Feed:                          Time in minutes
    1st _____ 20
    2nd _____  8
    1st _____ 27
    2nd _____ 15
    1st _____ 45
    2nd _____ 19
    1st _____ 56

The reaction was terminated by the addition of methanol, and a solid crystalline propylene-ethylene block copolymer having the following characteristics was recovered: percent ethylene in the total product=11.5, flow rate= 1.8, brittle point =−9.0° C., Izod impact—1.3 ft. lbs./ in., tensile impact=47.3 ft. lbs./in., yield tensile strength @ 1 in. per minute=3500 p.s.i., tensile strength @ 1 in. per minute=4300 p.s.i., percent elongation @ 1 in. per minute=376, tensile modulus=106,000 and flexural modulus=120,000.

*Controls F through L.*—When Example II was repeated with 0.25 weight percent of each of various phosphites and one phosphate and tested in the 280° F. oven, the results tabulated in Table 2 were obtained.

TABLE 2

| Example | Additive | 280° F. Oven Life In Hours |
|---|---|---|
| F | Triphenyl phosphite | 19 |
| G | Polygard [1] (alkylated aryl phosphite) | 22 |
| H | Tris-(nonylphenyl) phosphite | 22 |
| I | Tris-(2-chloroethyl) phosphite | 19 |
| J | Tris (isopropyl) phosphite | 22 |
| K | Tris (octadecyl) phosphite | 24 |
| L | Guanylurea phosphate | 19 |

[1] Trademark for non-staining, non-discoloring stabilizer for GR-S synthetic rubber.

In view of the otherwise expected similarity between the foregoing phosphites and the thiophosphites of this invention, it is unexpected that these phosphites, taught to be stabilizers in vinyl chloride polymers and rubber, are virtually useless for this purpose in polypropylene. Thus, whereas each of the thiophosphites of Example II provided polypropylene with heat stability at 280° F. of more than 1200 hours, otherwise similar phosphites of Controls F through L failed in 24 hours or less under these same conditions.

EXAMPLES IX AND X

Polypropylene monofilaments were melt-spun containing the additives specified in Table 3, a similar set of polypropylene monofilaments containing no additive being designated Control M. These monofilaments were exposed in an Atlas Fade-Ometer in accordance with the test method described hereinabove, the test data provided by these preparations being tabulated in Table 3. The percentages given in Table 3 are by weight of the polymer.

TABLE 3

| Example | | Fade-Ometer Hours to Break |
|---|---|---|
| IX | 0.25% trilauryl trithiophosphite | 100 |
| X | 2.0% trilauryl trithiophosphite | 440 |
| Control M | None (average of 3 tests) | 53 |

*Controls N through SS.*—Examples IX and X were repeated with the additives tabulated in Table 4, the quantity of additive being in weight percent of additive as related to weight of polypropylene.

TABLE 4

| | | Additive | Fade-Ometer Hours to Break |
|---|---|---|---|
| N | 0.5 | 2-hydroxy-4-methoxy-benzophenone | 20 |
| O | 1.0 | 5-chloro-2-hydroxy-benzophenone | 40 |
| P | 0.5 | 2,2 dihydroxy-4-methoxy-benzophenone (average of 3 tests). | 40 |
| Q1 | 0.25 | 2,2 dihydroxy 8 octoxy benzophenone | 40 |
| Q2 | 0.5 | do | 40 |
| R1 | 0.25 | 2,2',4,4'-tetrahydroxy-benzophenone | 40 |
| R2 | 0.5 | do | 40 |
| R3 | 1.0 | do | 40 |
| S1 | 0.5 | Disalicylal propylene diamine | 40 |
| S2 | 1.0 | do | 40 |
| T1 | 1.0 | p-Octyl-phenyl salicylate | 40 |
| T2 | 1.5 | do | 40 |
| T3 | 2.0 | do | 40 |
| U1 | 0.25 | 4-methyl-7-hydroxycoumarin | 20 |
| U2 | 0.5 | do | 40 |
| V | 0.5 | 2,5-di-t-amyl hydroquinone | 40 |
| W | 1.0 | Acetyl resorcinol | 20 |
| X | 1.0 | Dibenzoylresorcinol | 40 |
| Y | 1.0 | 2,6-bis-(2-hydroxy-3-t-butyl-5-methyl-benzyl)-4-methyl phenol (average of 2 tests). | 50 |
| Z1 | 0.25 | 2,6-bis-(2-hydroxy-3-t-butyl-5-methyl-benzyl)-durene. | 40 |
| Z2 | 0.5 | 2,6-bis-(2-hydroxy-3-t-butyl-5-methyl-benzyl)-durene. | 40 |
| Z3 | 1.0 | 2,6-bis-(2-hydroxy-3-t-butyl-5-methyl-benzyl)-durene. | 40 |
| Z4 | 1.5 | do | 40 |
| Z5 | 2.0 | do | 40 |
| AA1 | 0.25 | 2,6-ditertiary butyl-4-methyl-phenol | 40 |
| AA2 | 0.5 | do | 40 |
| AA3 | 1.0 | do | 40 |
| AA4 | 1.5 | do | 40 |
| AA5 | 2.0 | do | 40 |
| BB | 0.5 | 2,2'-methylene-bis-(4-methyl-6-t-butyl phenol) | 40 |
| CC | 1.0 | 4,4'-methylene-bis-(2,6-ditertiary butyl phenol) | 40 |

See footnote at end of table.

TABLE 4—Continued

| | | Additive | Fade-Ometer Hours to Break |
|---|---|---|---|
| DD1 | 0.25 | Epon 834 [1] (condensation product of epichlorohydrin and isopropylidene bis phenol). | 40 |
| DD2 | 0.5 | do | 40 |
| EE | 1.0 | (4-dimethylamino-phenyl)-4,5-diphenyl imidazole. | 40 |
| FF | 1.0 | (2-methoxy-phenyl)-4,5-diphenyl imidazole | 20 |
| GG | 1.0 | (4-hydroxy-phenyl)-4,5-diphenyl imidazole | 40 |
| HH | 1.0 | Octyl imidazole | 40 |
| II | 1.0 | Undecenylimidazole | 40 |
| JJ | 1.0 | Dodecylbenzyl-2-methyl imidazole | 40 |
| KK1 | 0.5 | Hexamethyl phosphoritriamide | 20 |
| KK2 | 1.0 | do | 20 |
| KK3 | 2.0 | do | 40 |
| LL | 1.0 | Diphenyl guanadine | 40 |
| MM1 | 0.5 | Dibutyltin dichloride | 40 |
| MM2 | 1.0 | do | 40 |
| MM3 | 1.5 | do | 20 |
| MM4 | 2.0 | do | 40 |
| NN1 | 0.25 | Dibutyltin maleate | 40 |
| NN2 | 0.5 | do | 40 |
| NN3 | 1.0 | do | 40 |
| OO | 1.0 | Dibutyltin dilaurate | 40 |
| PP1 | 0.25 | Tetraphenyltin | 40 |
| PP2 | 0.5 | do | 40 |
| PP3 | 1.0 | do | 20 |
| PP4 | 1.5 | do | 40 |
| PP5 | 2.0 | do | 20 |

[1] Trademark for a polymer having the formula:

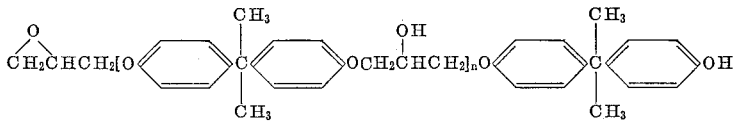

I claim:
1. A composition of matter comprising a solid crystalline polymer of propylene and a stabilizing quantity, effective to inhibit degradation of said polymer resulting from heat, oxidation, light and mechanical shear, of a material having the general formula $(RS)_3P$, wherein each R is a hydrocarbon radical having from about 6 to about 20 carbon atoms.
2. The composition of matter of claim 1 wherein said stabilizing quantity is in the range between about 0.005 and 2% by weight.
3. The composition of matter of claim 2 wherein said material is triphenyl trithiophosphite.
4. The composition of matter of claim 2 wherein said material is tribenzyl trithiophosphite.
5. The composition of matter of claim 2 wherein said material is trilauryl trithiophosphite.
6. The composition of matter of claim 5 wherein said stabilizing quantity is in the range between 0.25 and 2.0% by weight.
7. The composition of matter of claim 6 wherein said polymer is a homopolymer.
8. The composition of matter of claim 6 wherein said polymer is a block copolymer.
9. The composition of matter of claim 2 further characterized in that said composition additionally contains 0.005% to 2.0% by weight of a material having the formula: $(RO)_3P$, wherein R is a hydrocarbon radical having 6 to 20 carbon atoms.
10. The composition of matter of claim 9 further characterized in that said composition additionally contains at least one stabilizer selected from the group consisting of soaps of metals from Groups II, III and IV of the Periodic Table, epoxy compounds, and polycarboxylic acids having from two to three carbon atoms between at least one pair of carboxyl groups.
11. A process for preparing polymeric shaped articles having improved resistance to environmental degradation which comprises mixing a solid crystalline polymer of propylene and a stabilizing quantity, effective to inhibit degradation of said polymer resulting from heat, oxidation, light and mechanical shear, of a material having the general formula $(RS)_3P$, wherein each R is a hydrocarbon radical having from about 6 to about 20 carbon atoms, melting the mixture, and forming shaped articles from said melt.
12. The process of claim 11 wherein said stabilizing quantity is in the range between about 0.005 and 2% by weight.
13. The process of claim 12 wherein said material is triphenyl trithiophosphite.
14. The process of claim 12 wherein said material is tribenzyl trithiophosphite.
15. The process of claim 12 wherein said material is trilauryl trithiophosphite.
16. The process of claim 15 wherein said stabilizing quantity is in the range between 0.25 and 2.0% by weight.
17. The process of claim 16 wherein said polymer is a homopolymer.
18. The process of claim 16 wherein said polymer is a block copolymer.
19. The process of claim 12 further characterized in that there is additionally admixed 0.005% to 2.0% by weight of a material having the formula: $(RO)_3P$, wherein R is a hydrocarbon radical having 6 to 20 carbon atoms.
20. The process of claim 19 further characterized in that there is additionally admixed at least one stabilizer selected from the group consisting of soaps of metals from Groups II, III and IV of the Periodic Table, epoxy compounds, and polycarboxylic acids having from two to three carbon atoms between at least one pair of carboxyl groups.

References Cited by the Examiner

UNITED STATES PATENTS

| 2,824,847 | 2/1958 | Fath | 260—45.7 |
| 2,834,768 | 5/1958 | Freidlander | 260—45.7 |
| 2,985,617 | 5/1961 | Salyer et al. | 260—45.7 |
| 3,013,003 | 12/1961 | Maragliano | 260—45.95 |
| 3,119,783 | 1/1964 | Baun | 260—45.7 |

LEON J. BERCOVITZ, *Primary Examiner.*

HOSEA TAYLOR, *Assistant Examiner.*